United States Patent [19]

Mitschelen et al.

[11] Patent Number: 5,752,719
[45] Date of Patent: May 19, 1998

[54] ARRANGEMENT FOR THE TEMPORARY FIXING OF AN OBJECT ON A VEHICLE SEAT

[75] Inventors: Rolf Mitschelen, Kircheim/Teck; Werner Hauser, Calw, both of Germany

[73] Assignee: Mercedes-Benz AG, Stuttgart, Germany

[21] Appl. No.: 788,247

[22] Filed: Jan. 27, 1997

[30] Foreign Application Priority Data

Jan. 25, 1996 [DE] Germany ............ 196 02 597.4

[51] Int. Cl.⁶ ........................................ B60R 22/00
[52] U.S. Cl. .............. 280/801.1; 297/462; 224/275
[58] Field of Search .................... 280/801.1, 808; 297/467, 468, 483; 244/118.1, 122 R; 224/275

[56] References Cited

U.S. PATENT DOCUMENTS

| | | | |
|---|---|---|---|
| 4,291,915 | 9/1981 | Cox | 297/193 |
| 4,832,241 | 5/1989 | Radcliffe | 224/275 |
| 5,131,682 | 7/1992 | Reed | 280/801.1 |
| 5,582,462 | 12/1996 | Shea | 297/467 |
| 5,624,136 | 4/1997 | McGlothlin et al. | 280/801.1 |

FOREIGN PATENT DOCUMENTS

| | | |
|---|---|---|
| 0 486 184 A1 | 5/1992 | European Pat. Off. . |
| 0 486 184 B1 | 5/1992 | European Pat. Off. . |
| 3519322 | 12/1986 | Germany ............ 280/801.1 |
| 2124189 | 2/1984 | United Kingdom ........ 224/275 |
| WO 91/14598 | 10/1991 | WIPO . |

Primary Examiner—Christopher P. Ellis
Attorney, Agent, or Firm—Evenson, McKeown, Edwards & Lenahan, P.L.L.C.

[57] ABSTRACT

An arrangement for the temporary fixing of an object on a vehicle seat which is equipped with a safety belt is provided. For implementing such an arrangement via the simplest devices, a hanging hook is disposed in front of the seat surface of the seat cushion and, on the front side of the seat cushion facing away from the backrest, is arranged below the seat surface. In the area of its lap belt section, the locked safety belt is pulled over the object situated on the seat surface and is hung into the hanging hook via its belt strap.

13 Claims, 2 Drawing Sheets

ARRANGEMENT FOR THE TEMPORARY FIXING OF AN OBJECT ON A VEHICLE SEAT

BACKGROUND AND SUMMARY OF THE INVENTION

This invention relates to an arrangement for the temporary fixing of an object on a vehicle seat and, more particularly, to an arrangement for the temporary fixing of an object on a vehicle seat which has a seat cushion with a seat surface and a backrest, and is equipped with a three-point safety belt. When the safety belt is locked, a shoulder belt section is defined which extends diagonally over the front side of the backrest and a lap belt section is defined which extends over the seat surface of the seat cushion.

A known arrangement of this type described in WO 91/14598 A1) has a plurality of parallel, elastic stretch straps which are fastened on one end at a distance from one another on a wind-up roller, having a spring prestressing, integrated below the cushion in the seat substructure. On the other end, the elastic stretch straps are fastened on a transverse rod. For fixing an object, such as a container deposited on the seat surface of the seat cushion, the transverse rod is pulled over the seat surface and the object while the stretch straps are wound off the wind-up roller and are hooked into a hanging eyelet arranged between the backrest and the seat cushion. The elastic stretch straps will then tighten and hold the object on the seat cushion.

In the case of another known arrangement described European Patent document EP 0 486 184 A1, a baby basket deposited on the seat surface of a seat cushion is fastened via a safety belt assigned to the vehicle seat. For this purpose, a swivellable handle arranged on the baby basket has guiding devices for the insertion of the belt strap of the safety belt. After the belt strap was inserted in the guiding devices, the baby basket is tightened on the seat cushion by shifting the grip while the safety belt is locked.

There is therefore needed a fastening arrangement of the above-mentioned type for the fastening of arbitrary objects on the seat cushion which is implemented using the simplest devices. The fastening arrangement should require no additional devices or measures on the objects themselves, or make other demands with respect to equipping the objects.

These needs are met according to the present invention by an arrangement for the temporary fixing of an object on a vehicle seat which has a seat cushion with a seat surface and a backrest, and is equipped with a three-point safety belt. When the safety belt is locked, a shoulder belt section is defined which extends diagonally over the front side of the backrest and a lap belt section is defined which extends over the seat surface of the seat cushion. A hanging hook is disposed in front of the seat surface on the front side of the seat cushion facing away from the backrest. The lap belt section of the safety belt is pulled at an angle over the seat surface and is hung on the hanging hook.

The arrangement according to the invention has the advantage of consisting of only one hanging hook which, at low costs, can also be installed subsequently into the vehicle. The three-point safety belt, which carries out the securing of the object, is legally stipulated standard equipment in vehicles. For fixing the object deposited on the seat cushion, the safety belt is closed by the insertion of its buckle latch into the belt buckle. The belt strap is then pulled in the lap belt section over the object toward the front and is hung into the hanging hook. This already secures the object, for example, a briefcase. The automatic belt retractor with the belt tightener normally existing in the case of safety belts ties down the object on the seat cushion also in crash situations.

The fastening arrangement according to the invention can be assigned to the front passenger seat as well as to the rear seat. Since, as a rule, the rear seat unit has several seats with several safety belts each assigned to one seat, when hanging hooks are assigned to each of the seats, larger objects can be buckled on the seat cushion of the rear seat unit by using all of the safety belts.

According to a preferred embodiment of the invention, the hanging hook is arranged on the front side of the seat cushion in the center with respect to the seat surface of the seat cushion. As a result, a favorable course of the safety belt over the seat surface is obtained which leads to an optimal fixing of the object.

Other objects, advantages and novel features of the present invention will become apparent from the following detailed description of the invention when considered in conjunction with the accompanying drawings.

DETAILED DESCRIPTION OF THE DRAWINGS

Figure 1:
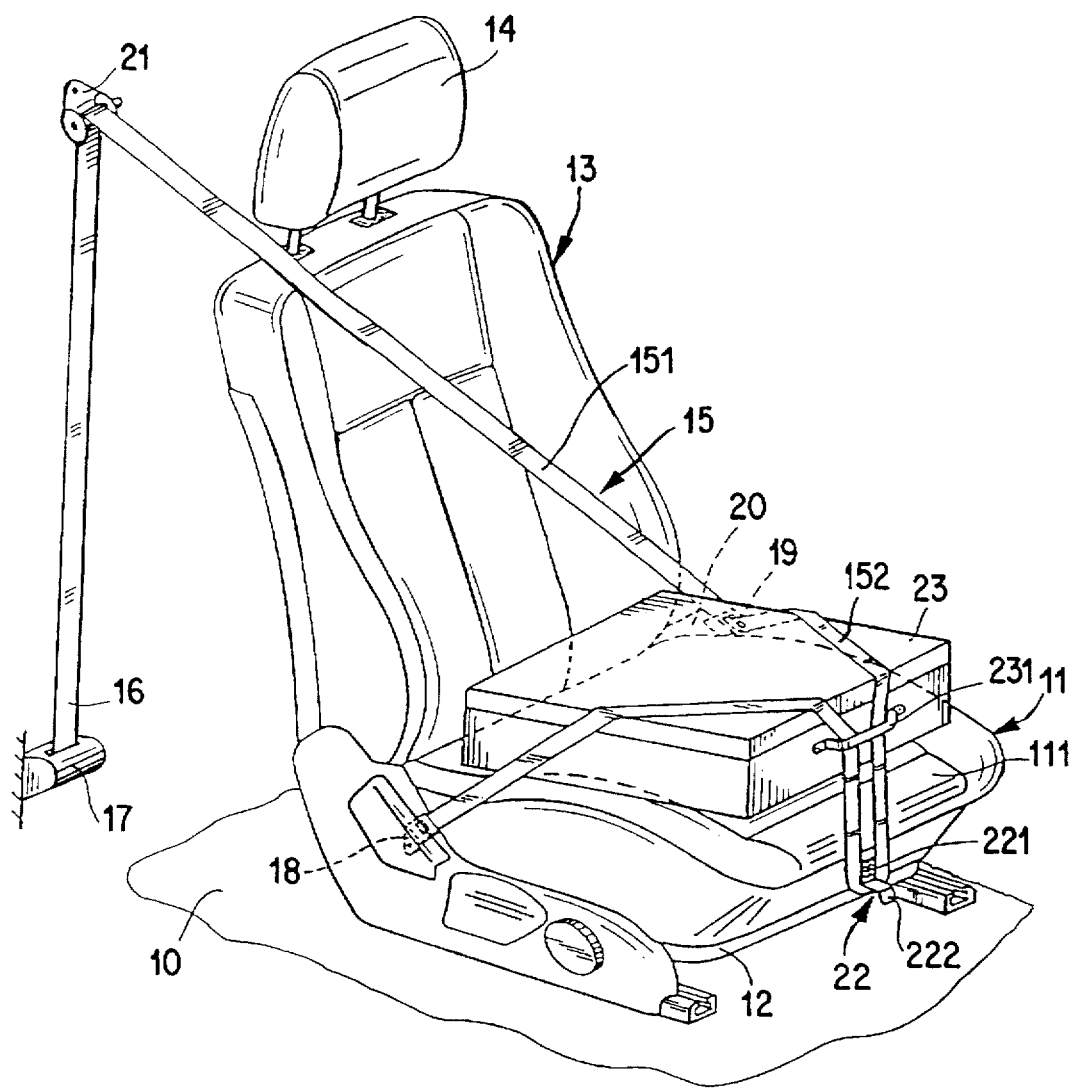
FIG. 1 is a perspective view of a front passenger seat of a motor vehicle with a briefcase fastened on the seat cushion in accordance with the present invention.

The front passenger seat of a passenger car illustrated perspectively in FIG. 1, in a known manner, has a seat cushion 11 which has a seat surface 111 and is accommodated in a substructure 12 of the seat. A backrest 13 is swivellably fastened to the substructure 12 of the seat and is equipped with a vertically adjustable head cushion 14. The front passenger seat is equipped with a safety belt 15. In a known manner, the belt strap 16 of the safety belt 15 is received on one end in an automatic belt retractor 17 having a belt tightener which is fastened on the vehicle floor 10 or on the center pillar of the vehicle body, and on the other end, is fixed on the substructure 12 of the seat by means of attachment hardware 18. A buckle latch 19, which can be slid on the belt strap 16 and can be fitted into a belt buckle 20 fastened to the substructure 12 of the seat, specifically on the opposite side of the seat from the attachment hardware, when the safety belt 15 is locked, divides the pulled-out belt strap 16 of the three-point safety belt 15 into a shoulder belt section 151 and a lap belt section 152. The shoulder belt section 151 extends from a deflection fitting 21 fixed to the vehicle above the backrest 13 transversely along the front side of the backrest 13 to the belt buckle 20. The lap belt section 152 extends from the belt buckle 20 transversely along the seat cushion 11 to the attachment hardware 18. On the front side of the seat cushion 11 facing away from the backrest 13, a hanging hook 22 is disposed in front of the seat surface 111. The hanging hook 22 is arranged below the seat surface 111. Via its hook opening, the hanging hook 22 points toward the vehicle floor 10. The hanging hook 22 has a hook root 221 which extends in parallel to the seat surface 111 and a hook nose 222 which is bent downward from there by about 90°. The length or the depth of the hook root 221 is slightly wider than the width of the belt strap 16 of the safety belt 15.

Viewed in the direction of the seat surface 111, the hanging hook 22 is arranged in the center and is fastened to the substructure 12 of the seat. In the embodiment of FIG. 1, the hanging hook 22 is fastened in a rigid manner. However, it can also be constructed so as to be detachable, in which case, a plug-in device is preferably arranged on the substructure 12 of the seat into which the hanging hook 22 is temporarily inserted. Likewise, it is possible to construct the hanging hook 22 such that, when it is not in use, it can be folded into the substructure 12 of the seat so that it is invisible when it is not in use and can be folded out again when in use into the operative position illustrated in FIG. 1. In use, when an object, for example, a small suitcase 23, carried along in the vehicle interior on the seat cushion 11 is to be secured, the safety belt 15 is locked by the insertion of the buckle latch 19 into the belt buckle 20. Then the belt strap 16 is gripped in the area of the lap belt section 152, is pulled in a triangular shape over the small suitcase 23, in which case, in addition, it can be pulled through the handle 231 of the small suitcase 23, and is then hooked under the hanging hook 22. As a result of the described construction of the hanging hook 22, the belt strap 16 rests flat on the hook root 221 and experiences no squeezing or damage. The automatic belt retractor 17 holds the safety belt 15 such that it is tightly pulled over the small suitcase 23; and in crash situations, the belt tightener integrated in the automatic belt retractor 17 secures or ties down the small suitcase 23 on the seat surface 111 of the seat cushion 11.

Figure 2:
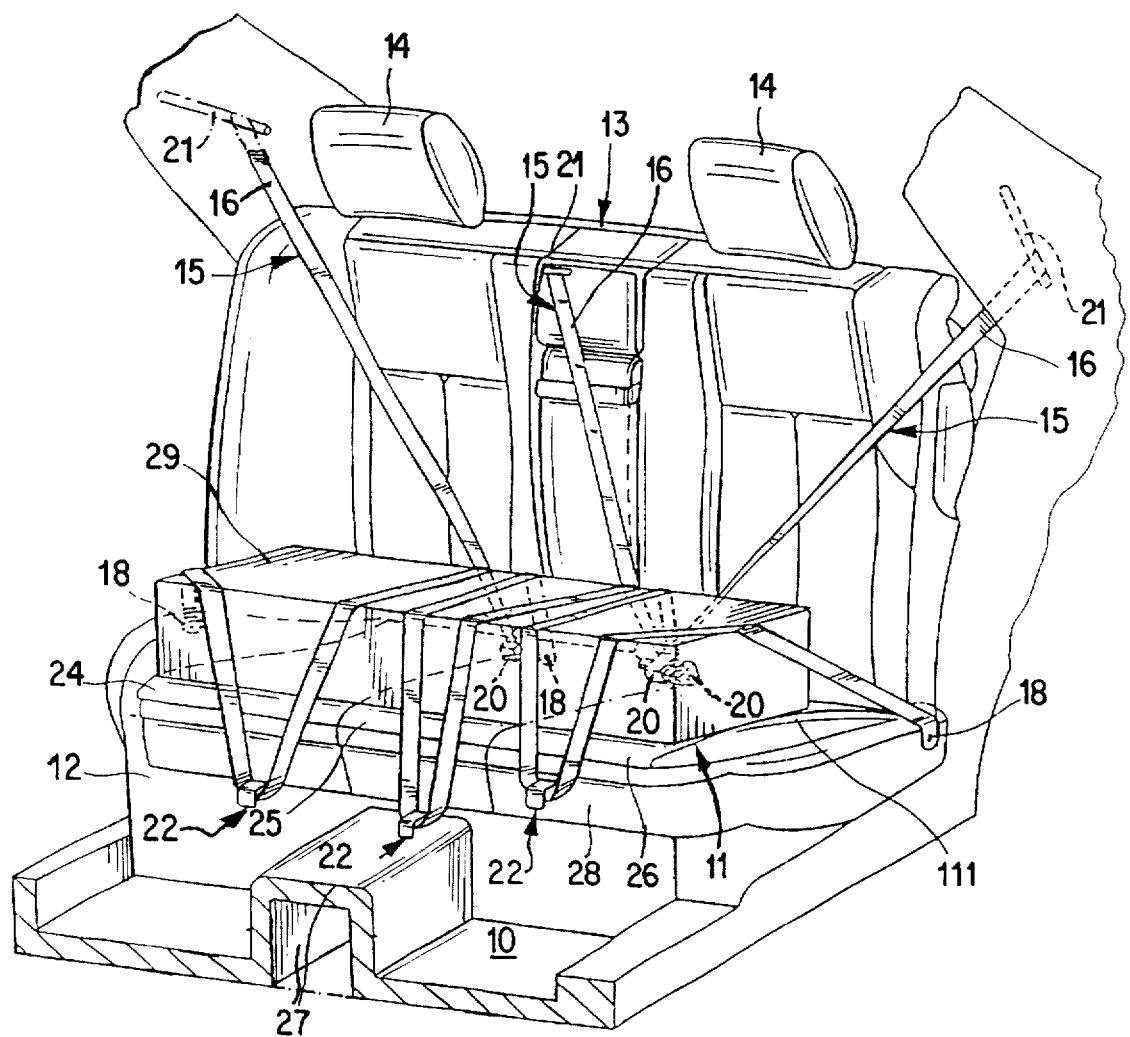
FIG. 2 is a perspective view of a three-seat rear seat unit of a motor vehicle having a suitcase-type container fastened on the seat cushion in accordance with the present invention.

In the case of a three-seat rear seat unit of a passenger car illustrated in FIG. 2, each seat 24 to 26 of the rear seat unit is equipped with a three-point safety belt 15 of the above-described type. The belt buckles of the safety belts 15 again have the reference number 20 and the deflection fittings again have the reference number 21. The deflection fitting 21 of the safety belt 15 assigned to the center seat 25 is fastened to the upper edge of the backrest 13.

A hanging hook 22 is assigned to each seat 24 to 26 in the center with respect to its seat surface 111, which hanging hook 22 is arranged on the front side of the continuous seat cushion 11 of the rear seat unit below the individual seat surfaces 111.

For demonstrating various arrangement possibilities of the hanging hook 22, the hanging hook 22 assigned to seat 24 is fastened to the vehicle floor 10 (cross member under the rear seat unit); the hanging hook 22 assigned to the center seat 25 is fastened to the vehicle floor 10, specifically on its transmission tunnel 27; and the hanging hook 22 assigned to seat 26 is fastened to the seat cushion bucket 28. Each hanging hook 22, in turn, can be fastened to be fixed, to be plugged in, or to be swivelled in. For fastening a larger piece of luggage, such as a trunk 29, on the seat cushion 11 of the rear seat unit, all three safety belts 15 are locked, and then the belt strap 16 of each safety belt 15 is pulled over the trunk 29 and hung into the three hanging hooks 22. The belt strap 16 of each safety belt will then extend within the lap belt section 152 from the belt buckle 20 situated close to the backrest 13 diagonally to the front over the trunk 29 to the hanging hook 22 and from there, again diagonally to the rear to the attachment hardware 18 on the substructure 12 of the seat 12 close to the backrest 13. The automatic belt retractors, which are not shown here, of the safety belts 15 tighten the belt straps 16; and, in crash situations, the belt tightener in each automatic belt retractor, in the same manner, ties down the trunk 29 on the rear seat unit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for temporarily fixing an object on a vehicle seat having a seat cushion with a seat surface and a backrest, the arrangement comprising:
    a three-point safety belt having a shoulder belt section and a lap belt section, said shoulder belt section extending diagonally over a front side of the backrest and said lap belt section extending over the seat surface of the seat cushion when said safety belt is locked;
    a hanging hook disposed in front of the seat surface on a front side of the seat cushion which faces away from the backrest; and
    wherein the lap belt section of the safety belt is pulled at an angle over the seat surface and is hung in said hanging hook.

2. The arrangement according to claim 1, wherein said hanging hook is arranged in a center area with respect to the seat surface of the seat cushion.

3. The arrangement according to claim 1, wherein said hanging hook is arranged below the seat cushion on a seat cushion bucket which receives the seat cushion.

4. The arrangement according to claim 2, wherein said hanging hook is arranged below the seat cushion on a seat cushion bucket which receives the seat cushion.

5. The arrangement according to claim 1, wherein said hanging hook is arranged below the seat cushion on a substructure of the vehicle seat which carries the seat cushion.

6. The arrangement according to claim 2, wherein said hanging hook is arranged below the seat cushion on a substructure of the vehicle seat which carries the seat cushion.

7. The arrangement according to claim 1, wherein said hanging hook is arranged on a vehicle floor.

8. The arrangement according to claim 2, wherein said hanging hook is arranged on a vehicle floor.

9. The arrangement according to claim 7, wherein said hanging hook is arranged on one of a transmission tunnel and cross member of said vehicle floor located below a rear seat unit.

10. The arrangement according to claim 8, wherein said hanging hook is arranged on one of a transmission tunnel and cross member of said vehicle floor located below a rear seat unit.

11. The arrangement according to claim 1, wherein said hanging hook is fastened in one of a: fixed manner, a swivellable manner, and a plugged-in manner.

12. The arrangement according to claim 1, wherein said hanging hook has a shape which prevents squeezing or damage to an inserted belt strap portion of said lap belt section.

13. The arrangement according to claim 12, wherein said hanging hook has a hook root extending in parallel to the seat surface, said hook root having a depth slightly larger than a width of the inserted belt strap of the belt lap section.

\* \* \* \* \*